United States Patent
Yamaguchi et al.

(10) Patent No.: US 9,436,121 B2
(45) Date of Patent: Sep. 6, 2016

(54) DRIVING APPARATUS, IMAGE FORMING APPARATUS, METHOD OF DRIVING CONTROL AND PROGRAM

(71) Applicants: Kohhei Yamaguchi, Kanagawa (JP); Hiroyuki Iwasaki, Kanagawa (JP); Yusuke Ishizaki, Kanagawa (JP)

(72) Inventors: Kohhei Yamaguchi, Kanagawa (JP); Hiroyuki Iwasaki, Kanagawa (JP); Yusuke Ishizaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/918,753

(22) Filed: Oct. 21, 2015

(65) Prior Publication Data

US 2016/0124342 A1    May 5, 2016

(30) Foreign Application Priority Data

Oct. 31, 2014 (JP) ................................ 2014-223088
Sep. 30, 2015 (JP) ................................ 2015-194992

(51) Int. Cl.
*G03G 15/08* (2006.01)
*H02H 5/00* (2006.01)

(52) U.S. Cl.
CPC ............ *G03G 15/0806* (2013.01); *H02H 5/00* (2013.01)

(58) Field of Classification Search
CPC ........... G03G 15/0806; G03G 15/757; G03G 21/1647; G03G 21/1857; G03G 2221/1657; G03G 21/186; G03G 15/1615; G03G 15/5008; H02H 5/00
See application file for complete search history.

(56) References Cited

U.S. PATENT DOCUMENTS

| | | | | |
|---|---|---|---|---|
| 5,995,802 A | * | 11/1999 | Mori | H04N 1/047 347/116 |
| 6,420,807 B1 | * | 7/2002 | Tsujimoto | H02K 51/00 310/103 |
| 7,242,890 B2 | * | 7/2007 | Yokota | G03G 21/186 399/111 |
| 8,385,777 B2 | | 2/2013 | Takigawa | |
| 2009/0263158 A1 | * | 10/2009 | Murata | G03G 15/161 399/167 |
| 2013/0216261 A1 | * | 8/2013 | Maeda | G03G 15/5008 399/167 |

FOREIGN PATENT DOCUMENTS

JP          63253979 A   * 10/1988
JP          2011-099537    5/2011

* cited by examiner

*Primary Examiner* — Francis Gray
(74) *Attorney, Agent, or Firm* — IPUSA, PLLC

(57) ABSTRACT

There is provided a driving apparatus comprising: a driving unit configured to rotate a driving shaft; a speed setting unit for setting a rotational speed of the driving shaft; a driving shaft joint connected with the driving shaft to rotate with the driving shaft for transmitting driving-force to a driven apparatus, the driving shaft joint being fitted into a driven shaft joint connected with the driven apparatus that is made detachable; a rotational position detection unit configured to detect a predetermined rotational position of the driving shaft joint; and a driving control unit configured to control the driving unit; wherein upon the driven apparatus being detached, the driving control unit controls the driving unit to stop the rotating driving shaft based on a detection result of the rotational position detection unit after the speed setting unit sets the rotational speed of the driving shaft to be a first rotational speed.

7 Claims, 11 Drawing Sheets

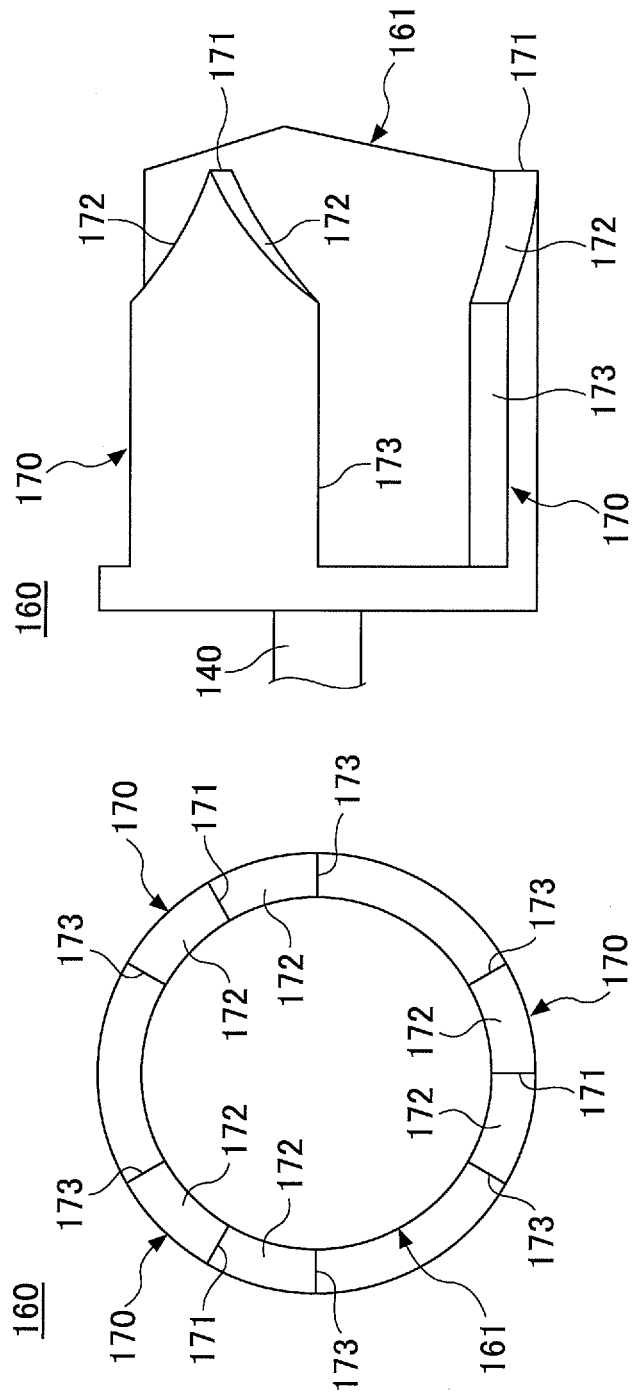

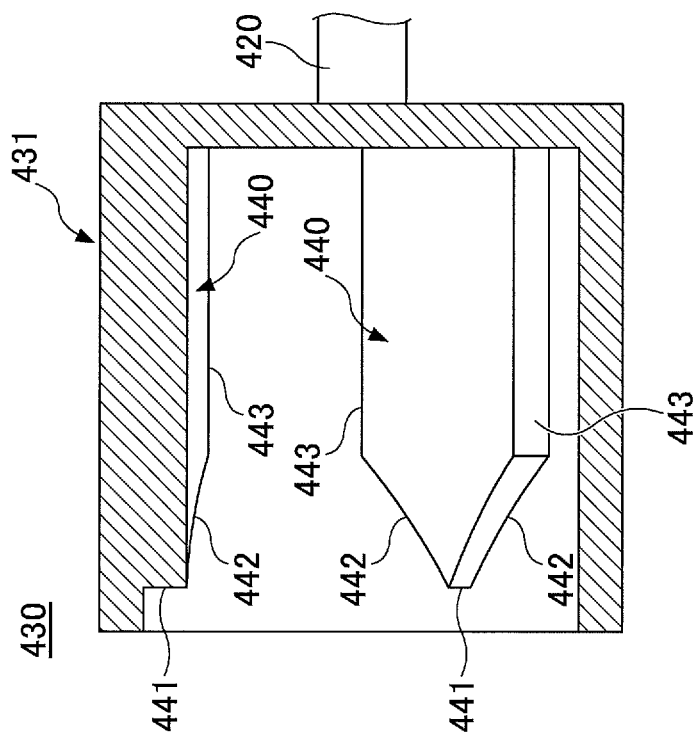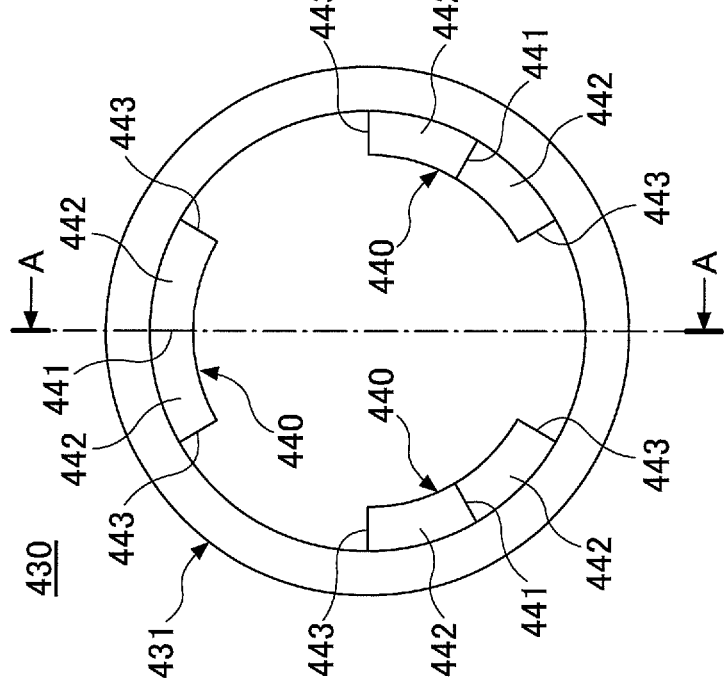

DRIVING APPARATUS, IMAGE FORMING APPARATUS, METHOD OF DRIVING CONTROL AND PROGRAM

BACKGROUND OF THE INVENTION

1. Field of the Invention

The present technology relates to a driving apparatus, an image forming apparatus, a method of driving control and a program.

2. Description of the Related Art

For example, in an electrophotographic image forming apparatus, units such as a developing device or a fixing device are provided detachably from a main body so that the units can be replaced upon a failure occurring. The respective units are coupled with the main body through a pair of couplings that are disposed at respective driving shafts and fitted into each other, and a developing roller or a fixing roller, etc., included in the respective units are rotated upon receiving driving-force from the main body through the couplings.

A structure is disclosed in which a deformable coupling part covered with an elastic member is provided so that vibration or degradation of durability due to collisions of the couplings caused by attaching/detaching the units can be prevented (for example, Patent Document 1).

However, according to a structure disclosed in Patent Document 1, manufacturing cost for parts and assembly may be increased since the deformable coupling part is required.

RELATED ART DOCUMENT

Patent Document

[Patent Document 1]: Japanese Laid-open Patent Publication No. 2011-99537

SUMMARY OF THE INVENTION

An object of disclosure of the present technology is to provide a driving apparatus which can maintain durability of a coupling part for coupling the driving apparatus with an apparatus driven by the driving apparatus.

The following configuration is adopted to achieve the aforementioned object.

In one aspect of the embodiment, there is provided a driving apparatus comprising: a driving unit configured to rotate a driving shaft; a speed setting unit configured to set a rotational speed at which the driving unit rotates the driving shaft; a driving shaft joint connected with the driving shaft to rotate with the driving shaft for transmitting driving-force to a driven apparatus, the driving shaft joint being fitted into a driven shaft joint connected with the driven apparatus that is made detachable; a rotational position detection unit configured to detect a predetermined rotational position of the driving shaft joint; and a driving control unit configured to control the driving unit; wherein upon the driven apparatus being detached, the driving control unit controls the driving unit to stop the rotating driving shaft based on a detection result of the rotational position detection unit after the speed setting unit sets the rotational speed of the driving shaft to be a first rotational speed, the first rotational speed being less than a normal rotational speed of the driving shaft set in normal operation of the driven apparatus.

Other objects, features and advantages of the present invention will become more apparent from the following detailed description when read in conjunction with the accompanying drawings.

BRIEF DESCRIPTION OF THE DRAWINGS

FIG. 3A is a front view of the drive side coupling.

FIG. 3B is a side view of the drive side coupling.

FIG. 4A is a front view of the developing side coupling.

FIG. 4B is a sectional view in A-A shown in FIG. 4A.

DETAILED DESCRIPTION OF THE PREFERRED EMBODIMENTS

Figure 1:
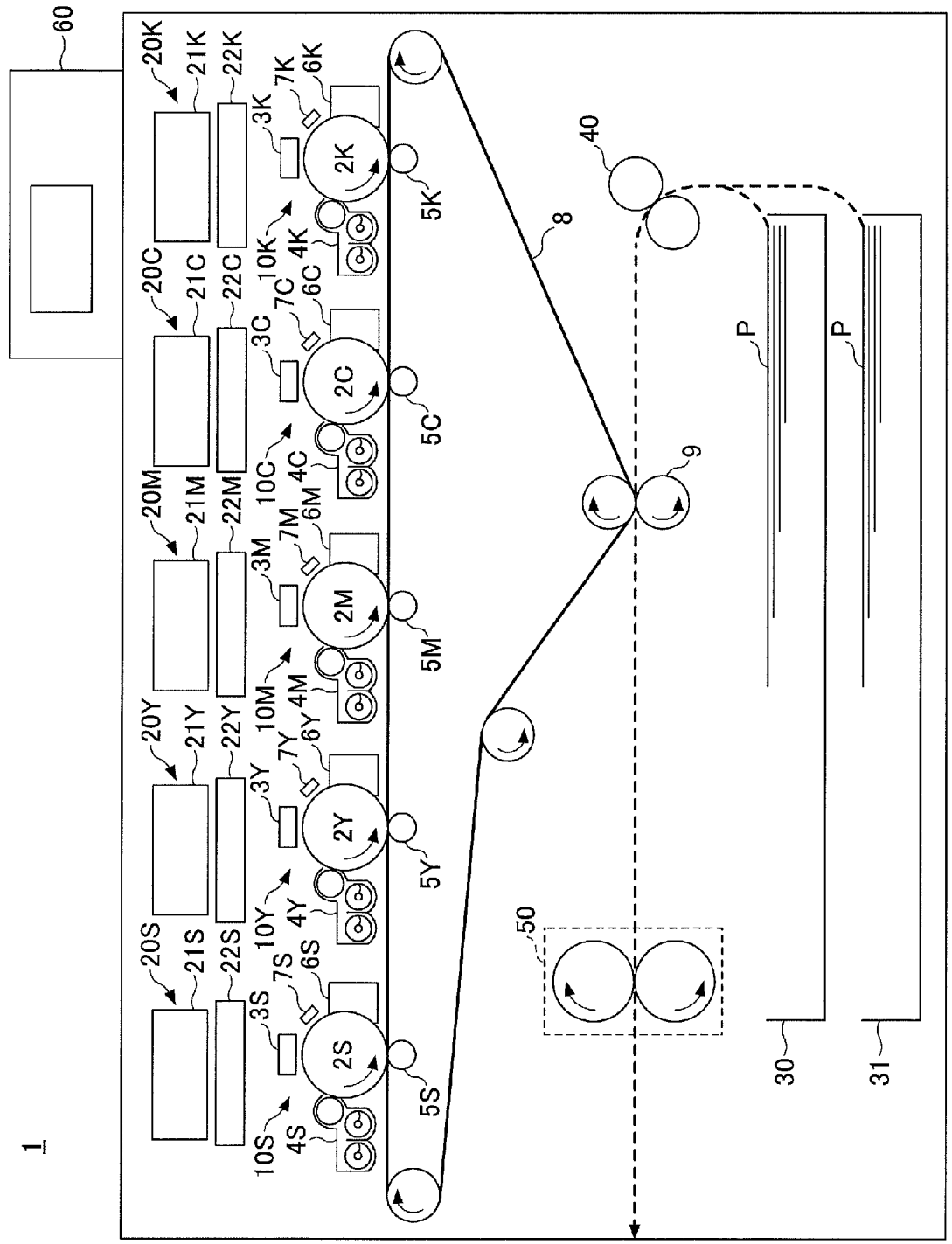
FIG. 1 is a diagram for illustrating a configuration of an image forming apparatus of the present embodiment.

Herein below, embodiments will be described with reference to the accompanying drawings. Additionally, in respective embodiments, identical reference numerals will be applied to an elements or the like that have substantially similar functions and configurations to those in another embodiment, and descriptions thereof may be omitted.

<Image Forming Apparatus>

FIG. 1 is a diagram for illustrating a configuration of an image forming apparatus 1 of the present embodiment.

The image forming apparatus 1 includes image forming units 10Y, 10M, 100, 10K and 10S, toner supply units 20Y, 20M, 20C, 20K and 20S, a fixing device 50 and an operational unit 60. The image forming apparatus 1 forms an image on a paper "P" conveyed from paper feeding units 30 and 31.

Additionally, respective reference characters "Y", "M", "C", "K" and "S" indicate toner colors of yellow, magenta, cyan and black, and hereinafter descriptions of these colors may be omitted. Also, "special color" means a tonner color used for color reproduction for forming an image which cannot be formed by conventional yellow, magenta, cyan and black, in a case such as forming an image by using white toner on a paper whose color is other than white, or glossing an image by using transparent toner.

The image forming unit 10 includes a photoconductor drum 2, a charging device 3, a developing device 4, a primary transfer roller 5, a cleaning device 6 and a discharging device 7. The image forming unit 10 forms toner images in respective colors on a surface of an intermediate transfer belt 8.

The photoconductor drum 2 is rotated in an arrow direction shown in FIG. 1, and an electrostatic latent image is formed by a writing device (not shown) based on image data after charging a surface of the photoconductor drum 2 by the charging device 3. The electrostatic latent image formed on the surface of the photoconductor drum 2 is transformed into a toner image by having the respective colors of toner adhere thereto by the developing device 4, thereby being transferred to the intermediate transfer belt 8 in between the photoconductor drum 2 and the primary transfer roller 5.

The photoconductor drum 2 whose toner image is transferred to the intermediate transfer belt 8 continues to be rotated to be removed the toner adhered thereto by the cleaning device 6, then it's surface is discharged by the discharging device 7 to prepare for next image forming.

Toner images formed by the respective colors of image forming units 10 are transferred to the intermediate transfer belt 8 in piles. A toner image composed of the toner images formed in piles on the surface of the intermediate transfer belt 8 are conveyed to a secondary transfer roller 9 with the intermediate transfer belt 8 rotationally driven by the rollers, and the toner image is transferred to the paper P conveyed from the paper feeding units 30 and 31 by a conveyance roller 40 and the like.

Upon the toner image being transferred on the surface of the paper P, the paper P is conveyed to the fixing device 50 to be heated and pressed so that the toner image is fixed on the paper P, then the paper P is ejected out of the apparatus.

For example, the operational unit 60 of the image forming apparatus 1 includes a display device such as a liquid crystal panel, keypad, etc., and accepts respective operations, setting changes, etc., from a user of the image forming apparatus 1.

In the image forming apparatus 1, respective units in the image forming unit 10 such as a developing device 4, the intermediate transfer belt 8, the secondary transfer roller 9, the fixing device 50, etc., are formed to be detachable from the main body so that they can be replaced, or the like if needed.

Detachable units such as the developing device 4 are provided in a manner such that a coupling disposed at the driving shaft of the detachable unit is fitted into a coupling disposed in the main body, thereby transmitting driving-force from a motor disposed in the main body to the detachable unit through the couplings. For example, the driving shaft of the developing device 4 is rotated by the driving-force transmitted from the motor disposed in the main body through a coupling, thereby rotating a developing roller, stirring screw, and the like.

<Driving Apparatus>

In the following, a driving apparatus 100 disposed in the image forming apparatus 1 will be described. In the following, the driving apparatus 100 drives the developing device 4 provided as the detachable unit.

Figure 2:
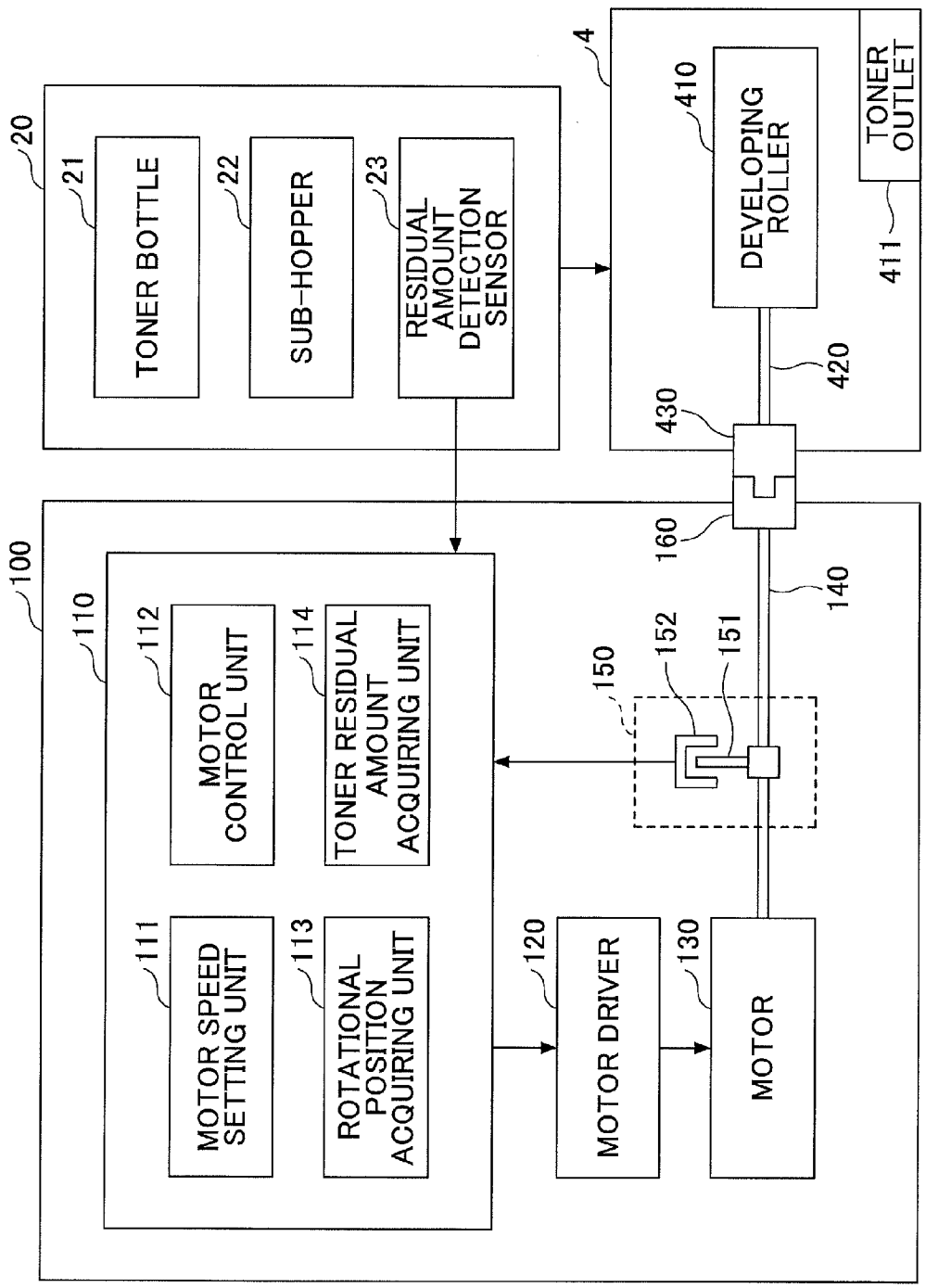
FIG. 2 is a diagram for illustrating an example configuration of the driving apparatus of the present embodiment.

FIG. 2 is a diagram for illustrating an example configuration of the driving apparatus 100 of the present embodiment.

As shown in FIG. 2, the driving apparatus 100 includes a control device 110, a motor driver 120, a motor 130, a driving shaft 140, a rotational position detection sensor 150 and a drive side coupling 160.

The control device 110 includes a motor speed setting unit 111, a motor control unit 112, a rotational position acquiring unit 113 and a toner residual amount acquiring unit 114. For example, the control device 110 includes a CPU, a ROM, a RAM, etc., and functions of the respective units are achieved by executing programs stored in the ROM by CPU in cooperation with the RAM.

The motor speed setting unit 111 sets a rotational speed of the motor 130 for rotating the developing roller 410, etc., in the developing device 4 in accordance with image forming condition, etc., set for the image forming apparatus 1.

The motor control unit 112 is an example of driving control unit, and it transmits a control signal to motor driver 120 so as to rotate the motor 130 at a rotational speed set by the motor speed setting unit 111. For example, the motor control unit 112 transmits a clock signal, a PWM signal, etc., to the motor driver 120 as the control signal. By changing a frequency of the clock signal, the rotational speed of the motor 130 can be controlled. By changing an active level duty of the PWM signal, the rotational speed of the motor 130 can be controlled.

For example, the motor control unit 112 can start or stop rotating the motor 130 by transmitting an enable signal to the motor driver 120. For example, the motor control unit 112 transmits the enable signal at a low level to start rotating the motor 130, while it transmits the enable signal at a high level to stop rotating the motor 130.

Further, in a case where the motor 130 has a brake function, the motor control unit 112 can actuate the brake function of the motor 130 by transmitting a brake signal to the motor driver 120. By transmitting the brake signal to actuate the brake function, the motor control unit 112 can stop the motor 130 quicker than by transmitting the enable signal to have the motor 130 freewheel, and thereby stopping the motor 130.

The rotational position acquiring unit 113 acquires a detection result of the rotational position detection sensor 150 for detecting a certain rotational position of the driving shaft 140 rotated in connection with the motor 130.

The toner residual amount acquiring unit 114 acquires residual amount of the toner remaining in a sub-hopper 22 from a residual amount detection sensor 23 disposed in a toner supply unit 20.

The motor driver 120 rotates the motor 130 based on the control signal transmitted from the motor control unit 112. Also, for example, the motor driver 120 transmits the lock signal at the low level to the motor control unit 112 in a case where the rotational speed of the motor 130 does not reach the set rotational speed, while it transmits the lock signal at the high level to the motor control unit 112 in a case where the rotational speed of the motor 130 reaches the set rotational speed.

The motor 130 is an example of driving unit, and it rotates under control of the motor control unit 112 through the motor driver 120. The driving shaft 140 is connected to the motor 130 to rotate in accordance with the motor's rotation.

For example, the motor 130 is a DC motor, and preferably has the brake function. When having the brake function, the rotating motor 130 can be stopped more quickly by actuating the brake function controlled by the motor control unit 112.

The rotational position detection sensor 150 is an example of rotational position detection unit, and includes a rotational member 151, a transmission photo sensor 152. For example, the rotational member 151 is a rod-like member fixed in a manner such that the rotational member 151 is extended from the center of rotational axis of the driving shaft 140 toward outside in a diameter direction. The rotational member 151 is rotated with the driving shaft 140.

The transmission photo sensor 152 includes a light emitting part and a light receiving part, and detects the rotational member 151 when the rotational member 151 rotated with the driving shaft 140 interrupts an optical path between the light emitting part and the light receiving part, thereby transmitting the detection result to the rotational position acquiring unit 113 of the control device 110.

The rotational position detection sensor 150 is provided to detect the rotational member 151 by the transmission photo sensor 152 when the drive side coupling 160 connected with the driving shaft 140 is at a certain rotational position. Additionally, the rotational position detection unit may have a configuration different from the rotational position detection sensor 150 of the present embodiment as long as it can detect that the drive side coupling 160 is at the certain rotational position.

The drive side coupling 160 is an example of driving shaft joint, and it is provided to be fixed at an end of the driving shaft 140, thereby rotating with driving shaft 140 in accordance with the motor 130. Also, the drive side coupling 160 is fitted into a developing side coupling 430 included in the developing device 4, and thereby transmits the driving-force from the motor 130 to the developing device 4.

The developing device 4 is an example of driven apparatus, in which a developing roller 410, a developer conveyance screw (not shown), etc., are connected with a driven shaft 420, where the developing side coupling 430 is disposed at the driven shaft 420 as a driven shaft joint. The developing roller 410 rotates at a certain rotational speed receiving the driving-force from the motor 130 of the driving apparatus 100.

The developing roller 410 is an example of developing unit. For example, the developing roller 410 to which developing bias is applied rotates holding developer including toner and carrier to form the toner image by having the toner adhere to the electrostatic latent image formed on the surface of the photoconductor drum 2. Also, a toner outlet 411 for ejecting redundant toner is provided in the developing device 4.

The toner supply unit 20 is an example of toner supply unit, and includes a toner bottle 21, a sub-hopper 22 and the residual amount detection sensor 23.

The toner bottle 21 stores toner whose color corresponds to the developing device 4, and for example, it rotates to eject the toner to the sub-hopper 22. The sub-hopper 22 temporarily retains the toner ejected from the toner bottle 21 and supplies the retained toner to the developing device 4. For example, the toner is supplied from the sub-hopper 22 to the developing device 4 through a diaphragm pump (not shown) as required.

The residual amount detection sensor 23 is an example of residual amount detection unit for detecting residual amount of the toner in the sub-hopper 22 to report the detection result to the toner residual amount acquiring unit 114 of the control device 110. For example, the residual amount detection sensor 23 is configured by a piezoelectric sensor, optical sensor, etc., disposed on an inner surface of the sub-hopper 22. However, the residual amount detection sensor 23 may be configured by other elements as long as it can detect the residual amount of the toner.

<Coupling>

In the following, the drive side coupling 160 and the developing side coupling 430 for connecting the driving apparatus 100 and the developing device 4 will be described.

FIG. 3A and FIG. 3B are diagrams for illustrating an example of drive side coupling 160. FIG. 3A is a front view of the drive side coupling 160. FIG. 3B is a side view of the drive side coupling 160.

As shown in FIG. 3, the drive side coupling 160 includes a columnar portion 161 and projecting portions 170 projecting from outer surface of the columnar portion 161. The drive side coupling 160 is fixed at an end of the driving shaft 140 to rotate with the driving shaft 140 driven by the motor 130.

The columnar portion 161 is fixed at an end of the driving shaft 140 in a manner such that a center axis direction thereof is in parallel with the driving shaft 140. The projection portions 170 are provided at three positions on the outer surface of the columnar portion 161 extending in parallel with the center axis direction of the columnar portion 161, where the projection portions 170 are spaced apart from each other in circumferential direction by equal distance. The respective projecting portions 170 include a pointed end 171 extending in a direction opposite to the driving shaft 140, incline surfaces 172 and drive transmission surfaces 173.

FIG. 4A and FIG. 4B are diagrams for illustrating an example of developing side coupling 430. FIG. 4A is a front view of the developing side coupling 430. FIG. 4B is a sectional view in A-A shown in FIG. 4A.

As shown in FIG. 4, the developing side coupling 430 includes a cylindrical portion 431, projecting portions 440 projecting from inner surface of the cylindrical portion 431. The developing side coupling 430 is fixed at an end of the driven shaft 420 of the developing device 4.

The cylindrical portion 431 has a hollow cylindrical shape shielded its end at the driven shaft 420 side. The cylindrical portion 431 is fixed at an end of the driven shaft 420 in a manner such that the center axis direction thereof is in parallel with the driven shaft 420. The projecting portions 440 are provided at three positions on the inner surface of the cylindrical portion 431 extending in parallel with the center axis direction of the cylindrical portion 431, where the projection portions 440 are spaced apart from each other in circumferential direction by equal distance. The respective projecting portions 440 include a pointed end 441 extending in a direction opposite to the driven shaft 420, incline surfaces 442 and driven transmission surfaces 443.

The drive side coupling 160 and the developing side coupling 430 are coupled with each other by inserting the columnar portion 161 into the cylindrical portion 431 where the respective projecting portions 170 of the drive side coupling 160 are inserted between the projecting portions 440 of the developing side coupling 430.

Upon the motor 130 being driven where the drive side coupling 160 and the developing side coupling 430 are coupled with each other, the drive side coupling 160 is rotated with the driving shaft 140. Upon the drive side coupling 160 rotating, the driving-force of the motor 130 is transmitted since the drive transmission surface 173 of the drive side coupling 160 is in contact with the driven transmission surface 443 of the developing side coupling 430, which causes both surfaces to be engaged with, thereby rotating the developing side coupling 430 and the driven shaft 420.

Here, for example, in a case where the developing device 4 is replaced with new one in the image forming apparatus 1, depending on the rotational position of the drive side coupling 160 and the developing side coupling 430, the projecting potion 170 may be inserted in a manner such that it collide with the projecting portion 440.

For example, in a case where the pointed end 171 of the drive side coupling 160 hits against the pointed end 441 or the incline surface 442 of the developing coupling 430 and the pointed end 441 of the developing side coupling 430 hits against the pointed end 171 or the incline surface 172 of the drive side coupling 160, the hit portions may be damaged.

Therefore, in the driving apparatus 100 of the present embodiment, the motor 130 is controlled so that the drive side coupling 160 is stopped at a certain rotational position at least when the developing device 4 is detached. If the drive side coupling 160 is stopped at the certain rotational position, the aforementioned collision can be avoided so as to prevent the damage of the respective portions in replacing the developing device 4 by adjusting the rotational position of the developing side coupling 430 in a newly attached developing device 4.

Figure 5:
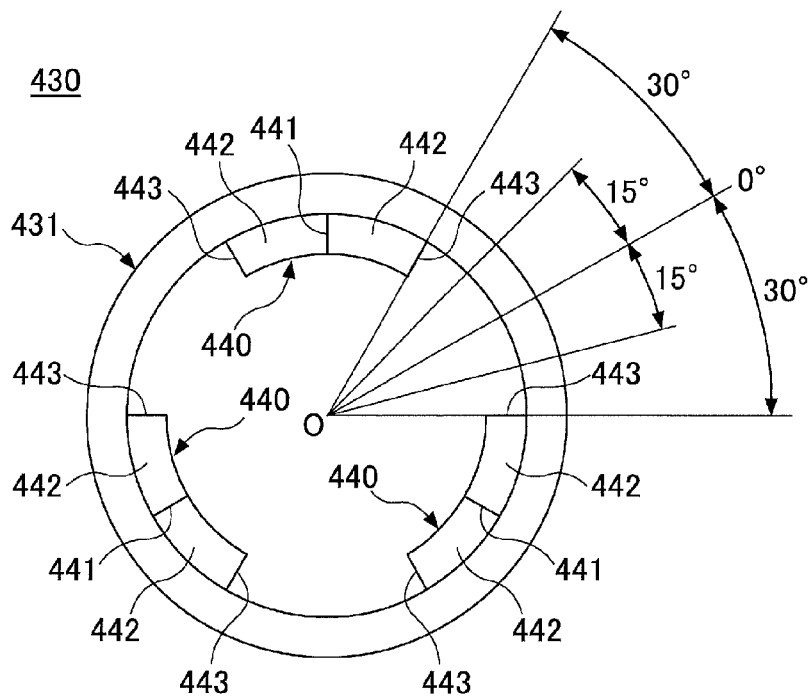
FIG. 5 is a diagram for illustrating stop position of the coupling.

As shown in FIG. 5, the developing side coupling 430 of the present embodiment, the projecting portions 440 are formed so that they are spaced apart from each other in circumferential direction by 60°. Therefore, for example, by stopping the drive side coupling 160 so that the pointed end 171 is stopped within a range of angles±30° from a reference line ("0°" shown in FIG. 5), the pointed end 171 can be inserted without hitting against the projection portion 440 of the developing side coupling 430, where "0" shows the center axis in FIG. 5.

However, preferably, the drive side coupling 160 is controlled so that the pointed end 171 is stopped within a range of angles±15° from a reference line ("0°" shown in FIG. 5), taking into account individual difference of the rotational positions of the developing side couplings 430 of the developing device 4.

In the present embodiment, the motor control unit 112 transmits the enable signal at the high level to the motor driver 120, thereby having the motor 130 stopped. In response to the enable signal at the high level, the motor driver 120 has the motor 130 freewheel, and thereby stopping the motor 130.

When the motor 130 freewheels to stop, the rotational position (stop position) at which the motor 130 is stopped varies. The variance of the stop position of the motor 130 causes variance of the stop position of the drive side coupling 160 rotating with the motor 130, and the variances of the stop positions depends on the rotational speed of the motor 130.

Figure 6:
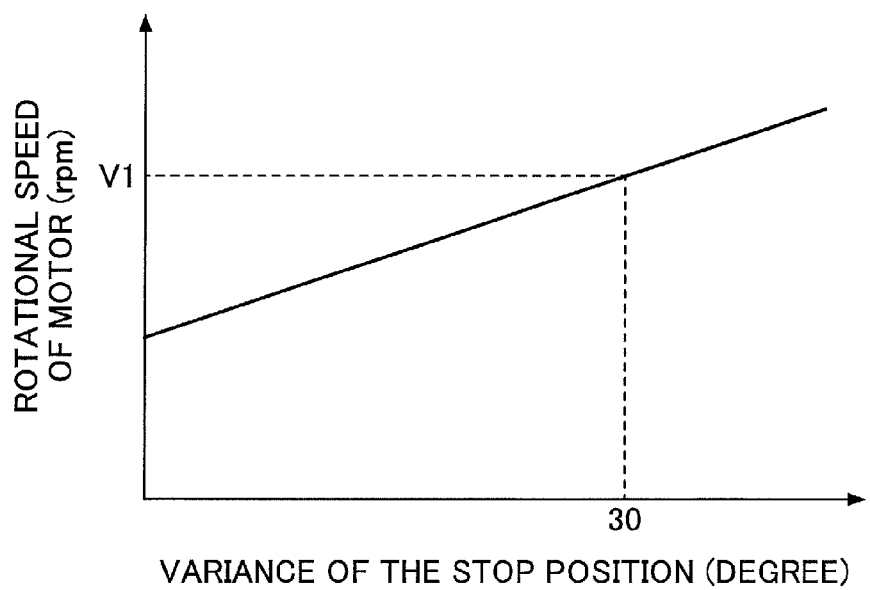
FIG. 6 is a diagram for illustrating an example relationship between the variance of stop position of the drive side coupling and the rotational speed of the motor.

FIG. 6 is a diagram for illustrating an example relationship between the variance of stop position of the drive side coupling 160 and the rotational speed of the motor 130.

As shown in FIG. 6, the variance of the stop position becomes greater as the rotational speed of the motor 130 becomes greater and it becomes smaller as the rotational speed of the motor 130 becomes smaller. Therefore, for example, the motor 130 needs to be controlled to drive at the rotational speed equal to or less than V1 in order to have the drive side coupling 160 stop at a rotational position within a range of angle±15° (30° in total) from a target rotational position.

Here, for example, the rotational speed V1 is less than a rotational speed of the motor 130 when the motor 130 is normally driven (rotational speed of the motor 130 in normal drive), e.g., when forming an image in the image forming apparatus 1. Additionally, the normal drive means a case where the developing device 4 is driven for forming an image by the image forming apparatus 1, etc., that is, a case where the driven apparatus connected with the motor 130 operates so as to function.

Thus, the motor 130 and the drive side coupling 160 can be stopped at a rotational position within a predetermined rage from the target rotational position by controlling the rotational speed of the motor 130 to be equal to or less than the rotational speed V1 set in the normal drive.

Additionally, in the examples described above, the shapes or configurations of the drive side coupling 160 and the developing side coupling 430 are not limiting examples. They may be different from those shown in the examples described above as long as the driving-force of the motor 130 is transmitted to the driven shaft 420.

Also, the stop position of the drive side coupling 160 is set according to a shape for coupling with the developing side coupling 430. Further, the rotational speed of the motor 130 is set based on variance of the stop position fluctuated depending on shapes of the drive side coupling 160 and the developing side coupling 430, or the like.

<Motor Control Process>

In the following, first to third embodiments of a process for controlling motor 130 when detaching the developing device 4 will be described.

First Embodiment

Figure 7:
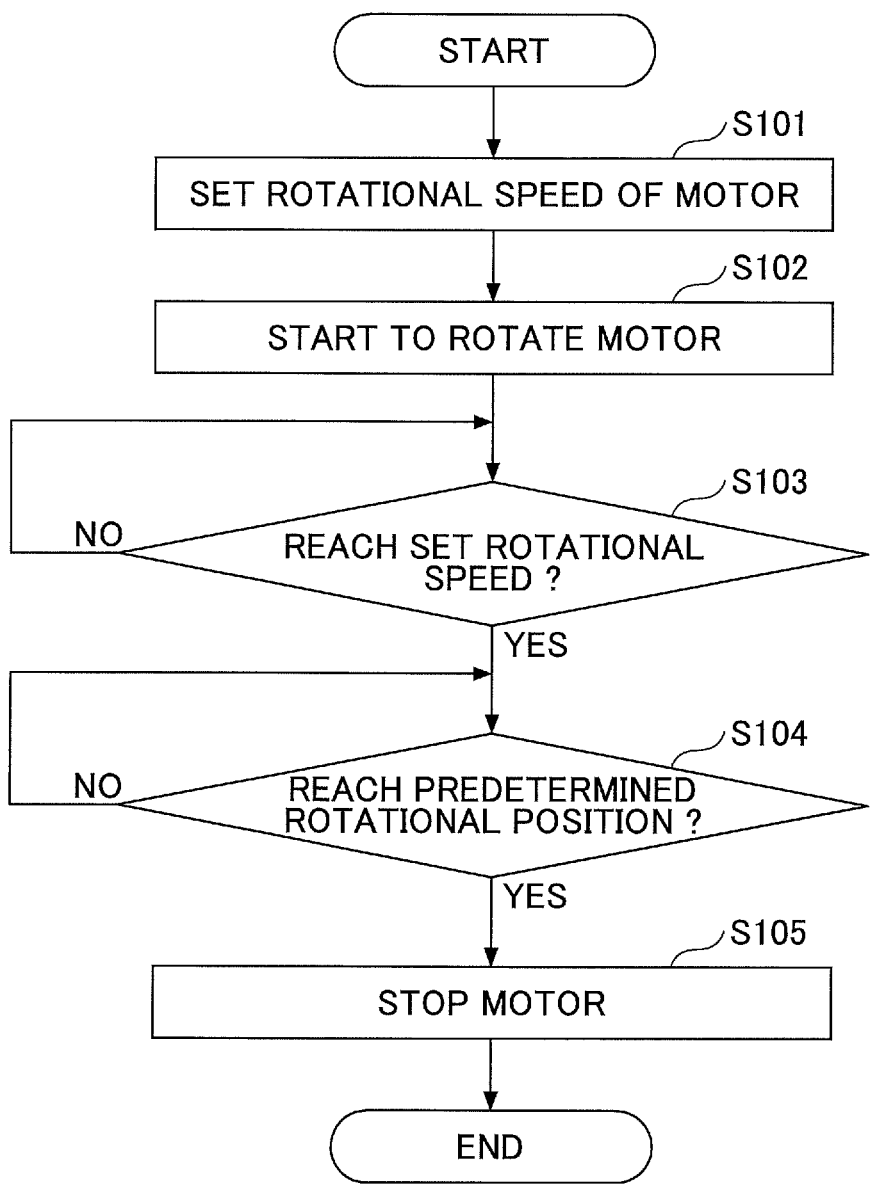
FIG. 7 is a flowchart for illustrating an example of motor control process of the first embodiment.

FIG. 7 is a flowchart for illustrating an example of motor control process of the first embodiment.

For example, in a case where the developing device 4 is detached from the image forming apparatus 1 to be replaced with new one, as shown in FIG. 7, in step S101, the motor speed setting unit 111 sets the rotational speed of the motor 130. For example, the rotational speed of the motor 130 is set to be equal to or less than the rotational speed V1 which is less than the rotational speed of the normal drive for forming an image by the image forming apparatus 1, etc., and where the variance of the stop position of the drive side coupling 160 can be suppressed to be within a predetermined range of the rotational position.

In step S102, the motor control unit 112 transmits the enable signal at the low level to the motor driver 120 to have the motor 130 rotate at the rotational speed set by the motor speed setting unit 111.

In step S103, the motor control unit 112 determines whether the rotational speed of the motor 130 reaches the set rotational speed based on the lock signal transmitted from the motor driver 120.

In a case where the rotational speed of the motor 130 is determined to reach the set rotational speed, the process is proceeded to step S104, and the rotational position acquiring unit 113 acquires the detection result of the rotational position detection sensor 150 and determines whether the rotational position of the driving shaft 140 and the drive side coupling 160 reaches a predetermined rotational position.

The rotational position detection sensor 150 is configured so as to detect a rotational position of the drive side coupling 160, where the stop position of the drive side coupling 160 comes within a target range when the motor 130 stops after freewheeling. That is, the transmission photo sensor 152 detects the rotational member 151 upon the drive side coupling 160 reaching a predetermined rotational position.

Upon the rotational position detection sensor 150 detecting that the drive side coupling 160 is at the predetermined rotational position, the motor control unit 112 transmits the enable signal at the high level to the motor driver 120 to stop the motor 130 in step S105.

Figure 8:
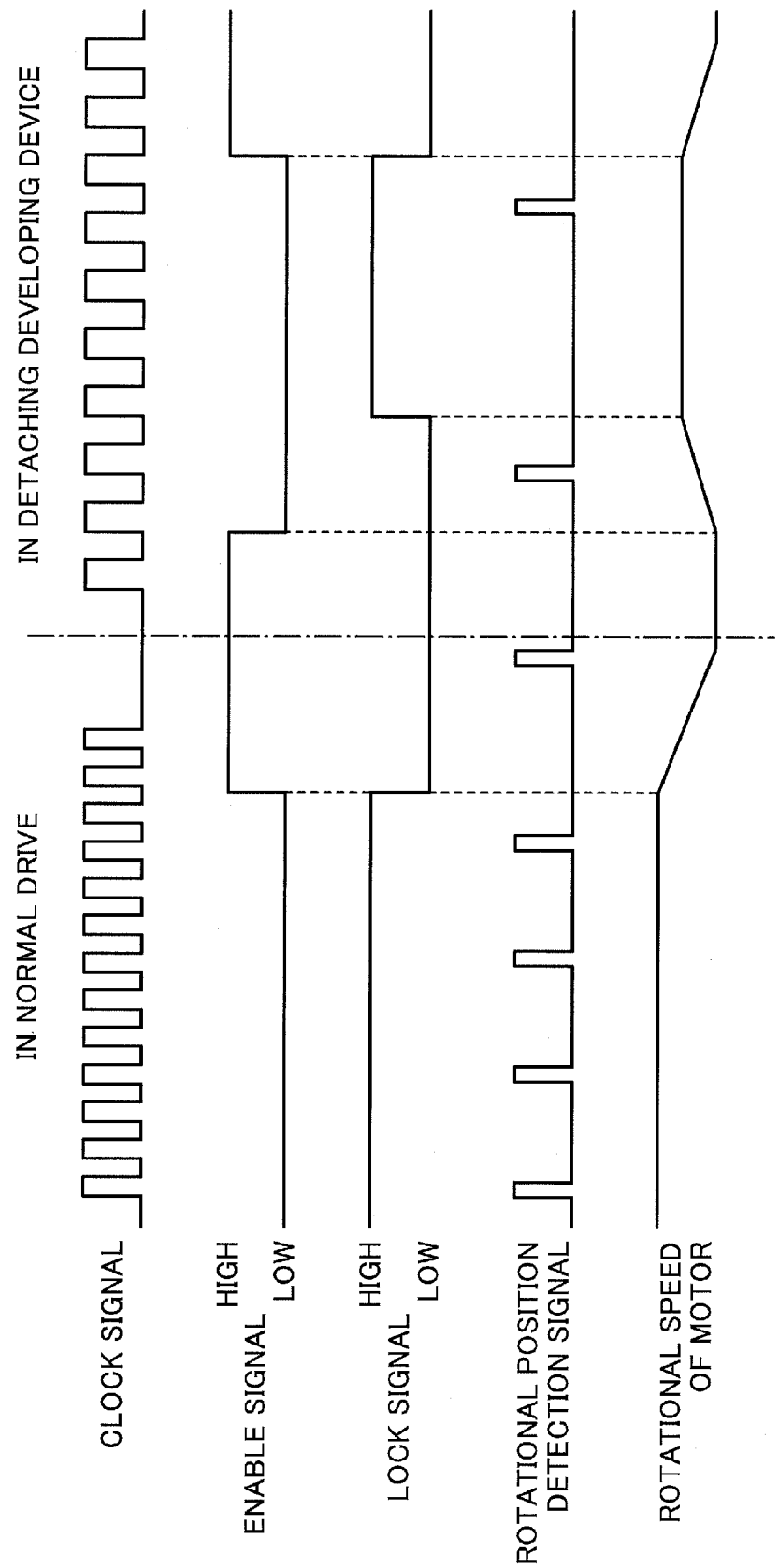
FIG. 8 is a diagram for illustrating an example motor control in the first embodiment.

FIG. 8 is a diagram for illustrating an example motor control in the first embodiment.

FIG. 8 is a timing diagram for illustrating waveforms of signals for performing the process shown in FIG. 7 in order to detach the developing device 4 after the motor 130 has been driven in a normal state then, stopped. As shown in FIG. 8, for example, the motor control unit 112 outputs the clock signal at a frequency for having the motor 130 rotate at the rotational speed set by the motor speed setting unit 111 to the motor driver 120. In detaching the developing device 4, a frequency of the clock signal becomes lower in comparison to that in normal drive. Also, in a case where the developing device 4 is detached, the motor control unit 112 transmits the enable signal at the low level to the motor driver 120, thereby having the motor 130 start to rotate.

Upon the rotational speed of the motor 130 reaching the set rotational speed, the lock signal at the high level is transmitted from the motor driver 120 to the motor control unit 112. When detaching the developing device 4, upon the rotational position acquiring unit 113 receiving a detection signal from the rotational position detection sensor 150 during the motor 130 rotating at the set rotational speed, the motor control unit 112 transmits the enable signal at the high level to the motor driver 120 to stop driving the motor 130. Here, the lock signal at the low level is transmitted from the motor driver 120 to the motor control unit 112 upon the rotational speed of the motor 130 becoming the set rotational speed.

Additionally, in the normal drive, the motor control unit 112 does not have the motor 130 stop even if the rotational position acquiring unit 113 receives the detection signal from the rotational position detection sensor 150. Also, the rotational position acquiring unit 113 may start to receive the rotational position detection signal from the rotational position detection sensor 150 after certain period (e.g., several seconds) passes from a timing at which the lock signal at the high level is transmitted from the motor driver 120 to the motor control unit 112 in a case where the developing device 4 is detached.

Additionally, although in the example shown in FIG. 8, the motor control process starts in a state where the motor 130 is stopped, the motor control process of the first embodiment may start in response to an operation mode being set to be a replacement mode of the developing device 4 while the motor 130 is driven. In this case, the motor control unit 112 has the frequency of the clock signal be lower upon an instruction indicating that the developing device 4 will be detached being given to the motor control unit 112. When the frequency of the clock signal becomes lower, the lock signal at the low level is output from the motor driver 120 since the motor 130 does not rotate at the rotational speed set for the normal drive. When the rotational speed of the motor 130 becomes the rotational speed set for detaching the developing device, the lock signal at the high level is output from the motor driver 120. When the rotational position acquiring unit 113 receives the detection signal from the rotational position detection sensor 150 after the lock signal at the high level has been output from the motor driver 120, the motor control unit 112 transmits the enable signal at the high level so as to stop the motor 130.

For example, in a case where the developing device 4 is detached to be replaced with new one in the image forming apparatus 1, the drive side coupling 160 is stopped at a rotational position within the target range of the rotational position by performing the motor control process of the first embodiment.

Therefore, by adjusting the rotational position of the developing side coupling 430 of the new developing device 4 in advance, the damage in attaching the new developing device 4 caused by the collision of the projection portions 170 and 440 of the drive side coupling 160 and the developing side coupling 430 can be reduced.

Second Embodiment

In the following, the motor control process in a case where the motor 130 has the brake function will be described.

In a case where the motor 130 has the brake function, the rotating motor 130 can be stopped quicker by transmitting the brake signal from the motor control unit 112 to the motor driver 120 to have the brake function operate.

Figure 9:
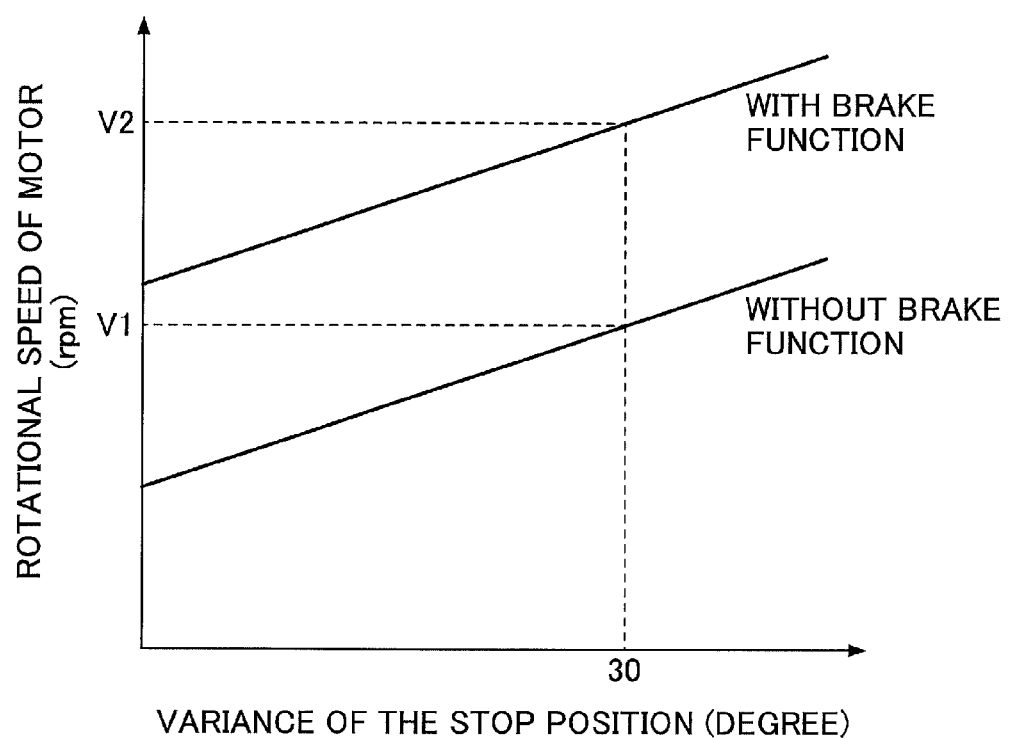
FIG. 9 is a diagram for illustrating an example relationship between the variance of stop position of the drive side coupling and the rotational speed of the motor in the second embodiment.

FIG. 9 is another diagram for illustrating an example relationship between the variance of stop position of the drive side coupling 160 and the rotational speed of the motor 130. In FIG. 9, a case where the motor 130 has the brake function and a case where the motor 130 does not have the brake function are shown.

As shown in FIG. 9, the variance of the stop position at the same speed is smaller in the case where the motor 130 has the brake function in comparison to the case where the motor 130 does not have the brake function. Therefore, a maximum rotational speed of the motor 130 for suppressing the variance of the stop position to be within the range of angle 30° can be set as rotational speed V2 that is greater than the maximum rotational speed V1 set in a case where the motor 130 does not have the brake function.

Thus, in a case where the motor 130 has the brake function, time taken for the motor control process can be reduced since the variance of the stop position can be suppressed even when the motor 130 is stopped while rotating at a greater rotational speed which is less than the rotational speed in the normal drive.

Figure 10:
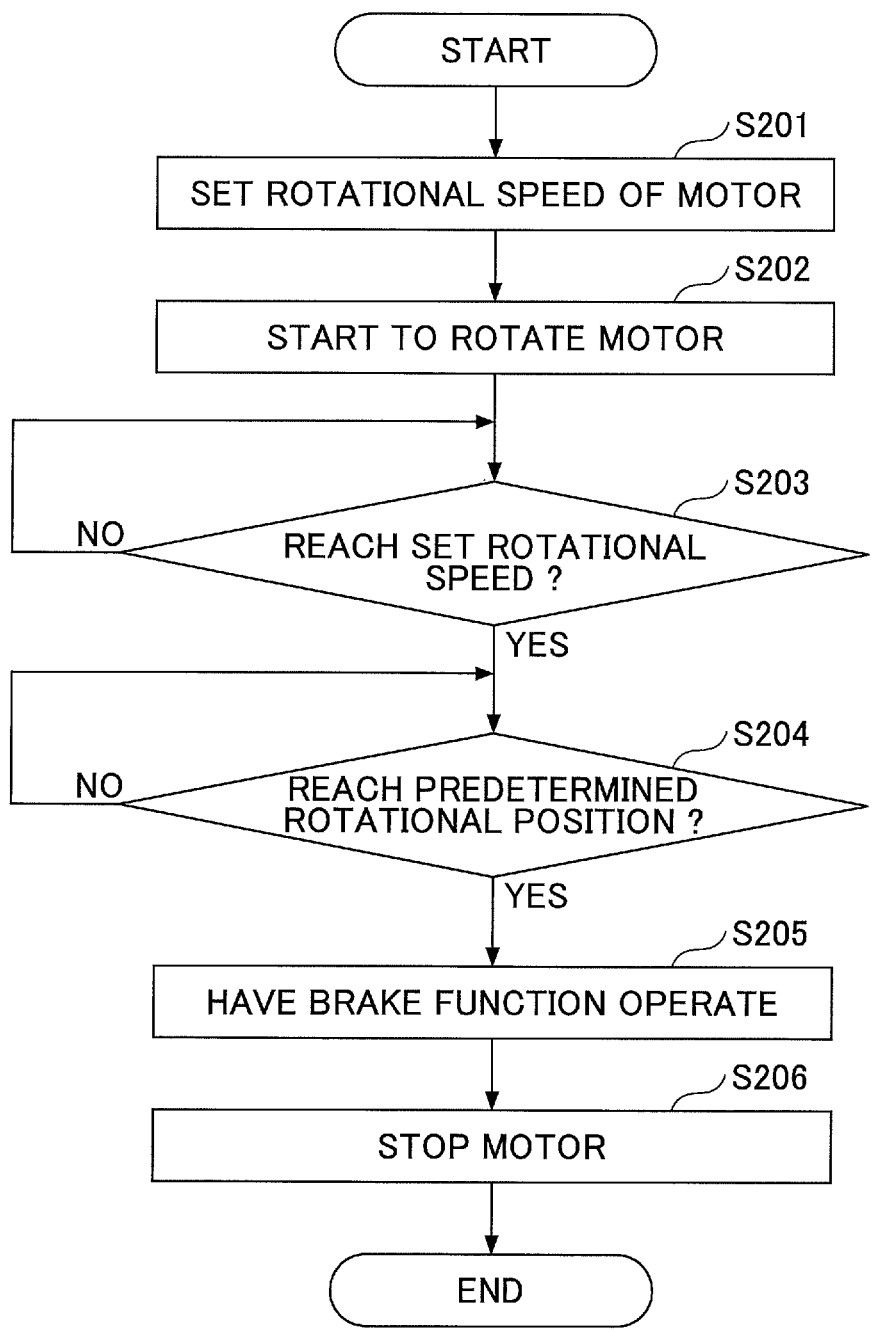
FIG. 10 is a flowchart for illustrating an example motor control process of the second embodiment.

FIG. 10 is a flowchart for illustrating an example motor control process of the second embodiment.

For example, in a case where the developing device 4 is detached from the image forming apparatus 1 to be replaced with new one, as shown in FIG. 10, in step S201, the motor speed setting unit 111 sets the rotational speed of the motor 130. For example, the rotational speed of the motor 130 is set to be equal to or less than the rotational speed V2 which is less than the rotational speed of the normal drive for forming an image by the image forming apparatus 1, etc., and where the variance of the stop position of the drive side coupling 160 can be suppressed to be within a predetermined range of the rotational position.

In step S202, the motor control unit 112 transmits the enable signal at the low level to the motor driver 120 to have the motor 130 rotate at the rotational speed set by the motor speed setting unit 111.

In step S203, the motor control unit 112 determines whether the rotational speed of the motor 130 reaches the set rotational speed based on the lock signal transmitted from the motor driver 120.

In a case where the rotational speed of the motor 130 is determined to reach the set rotational speed, the process is proceeded to step S204, and the rotational position acquiring unit 113 acquires the detection result of the rotational position detection sensor 150 and determines whether the rotational position of the driving shaft 140 and the drive side coupling 160 reaches a predetermined rotational position.

Upon the rotational position detection sensor 150 detecting that the drive side coupling 160 is at the predetermined rotational position, the motor control unit 112 transmits the brake signal to the motor driver 120 to have the brake function of the motor 130 operate in step S205. In step S206, the motor control unit 112 transmits the enable signal at the high level to the motor driver 120 to have the motor 130 stopped.

Figure 11:
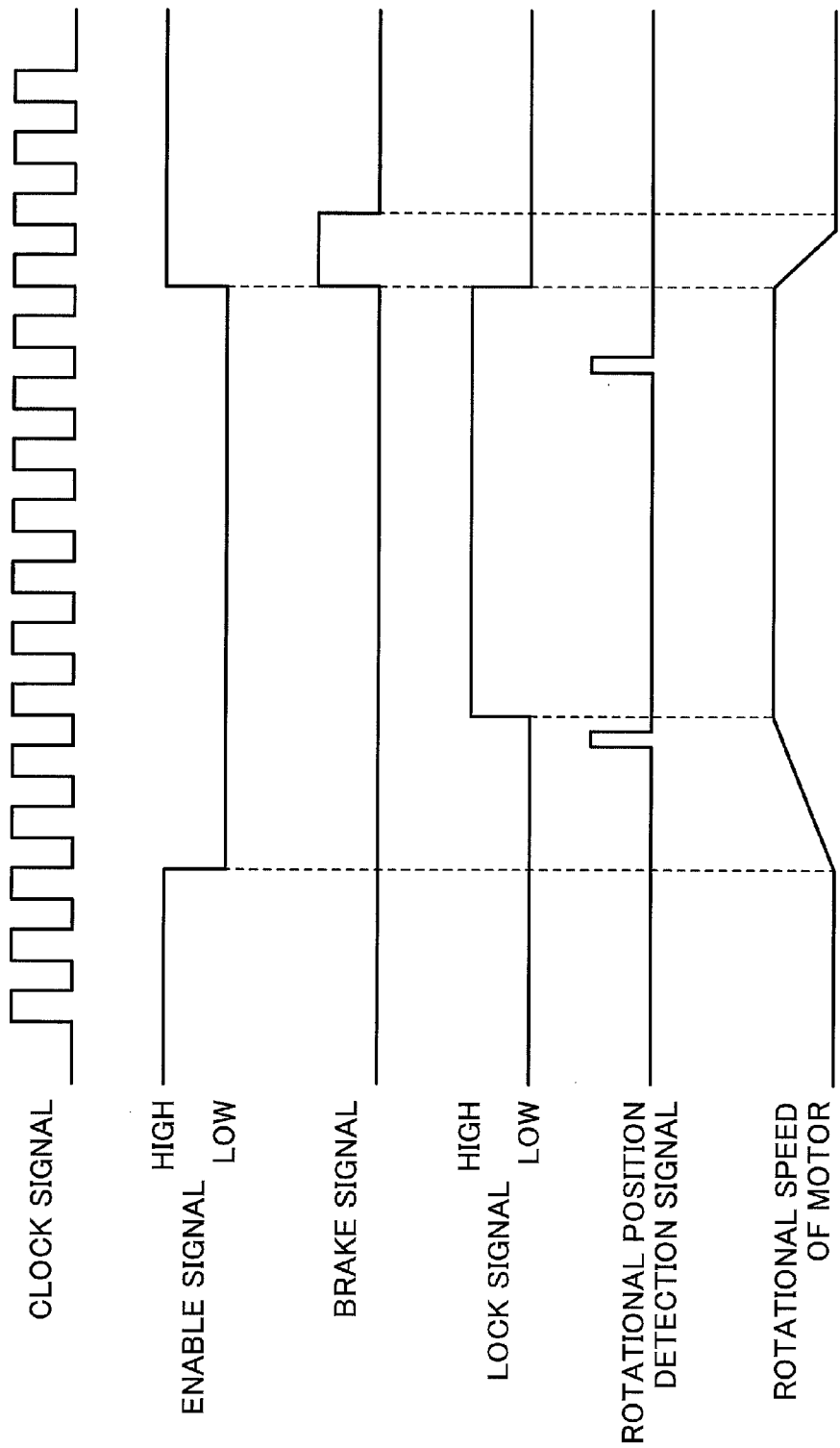
FIG. 11 is a diagram for illustrating the motor control in the second embodiment.

FIG. 11 is a diagram for illustrating the motor control in the second embodiment.

The timing diagram shown in FIG. 11 illustrates the motor control in detaching the developing device. As shown in FIG. 11, for example, the motor control unit 112 outputs the clock signal at a frequency for having the motor 130 rotate at the rotational speed set by the motor speed setting unit 111 to the motor driver 120. Also, the motor control unit 112 transmits the enable signal at the low level to the motor driver 120, thereby having the motor 130 start to rotate.

Upon the rotational speed of the motor 130 reaching the set rotational speed, the lock signal at the high level is transmitted from the motor driver 120 to the motor control unit 112. Upon the rotational position acquiring unit 113 receiving a detection signal from the rotational position detection sensor 150 during the motor 130 rotating at the set rotational speed, the motor control unit 112 transmits the brake signal to the motor driver 120 to have the brake function of the motor 130 operate. Then, the motor control unit 112 transmits the enable signal at the high level to the motor driver 120 to stop driving the motor 130. Here, the lock signal at the low level is transmitted from the motor driver 120 to the motor control unit 112 upon the rotational speed of the motor 130 being less than the set rotational speed.

Additionally, although in the example shown in FIG. 11, the motor control process starts in a state where the motor 130 is stopped, the motor control process of the second embodiment may start while the motor 130 is driven as described in the first embodiment.

Similarly to the first embodiment, according to the motor control process of the second embodiment, the drive side coupling 160 is stopped at a rotational position within the target range of the rotational position. Therefore, the damage in replacing the developing device 4 caused by the collision of the projection portions 170 and 440 of the drive side coupling 160 and the developing side coupling 430 can be reduced.

Also, in the second embodiment, the rotating motor 130 can be stopped quicker by having the brake function of the motor 130 operate. Therefore, the motor control process can be completed in a short period.

Third Embodiment

In the following, for example, the motor control process in a case where a developing device 4S for developing the white toner is replaced with another developing device 4S for developing the transparent toner will be described.

In a case where the developing device 4S is replace with that of another color in the image forming apparatus 1, the toner bottle 21S will be replaced. However, the toner of the color may be mixed with the toner of the other color if the toner of the color still remains in the sub-hopper 22 or a toner supply path between the sub-hopper 22 and the developing device 4S.

Therefore, in the third embodiment, a process for eliminating the remained toner from the sub-hopper 22 or the toner supply path between the sub-hopper 22 and the developing device 4S is performed before the developing device 4S to be replaced with new one is detached.

Figure 12:
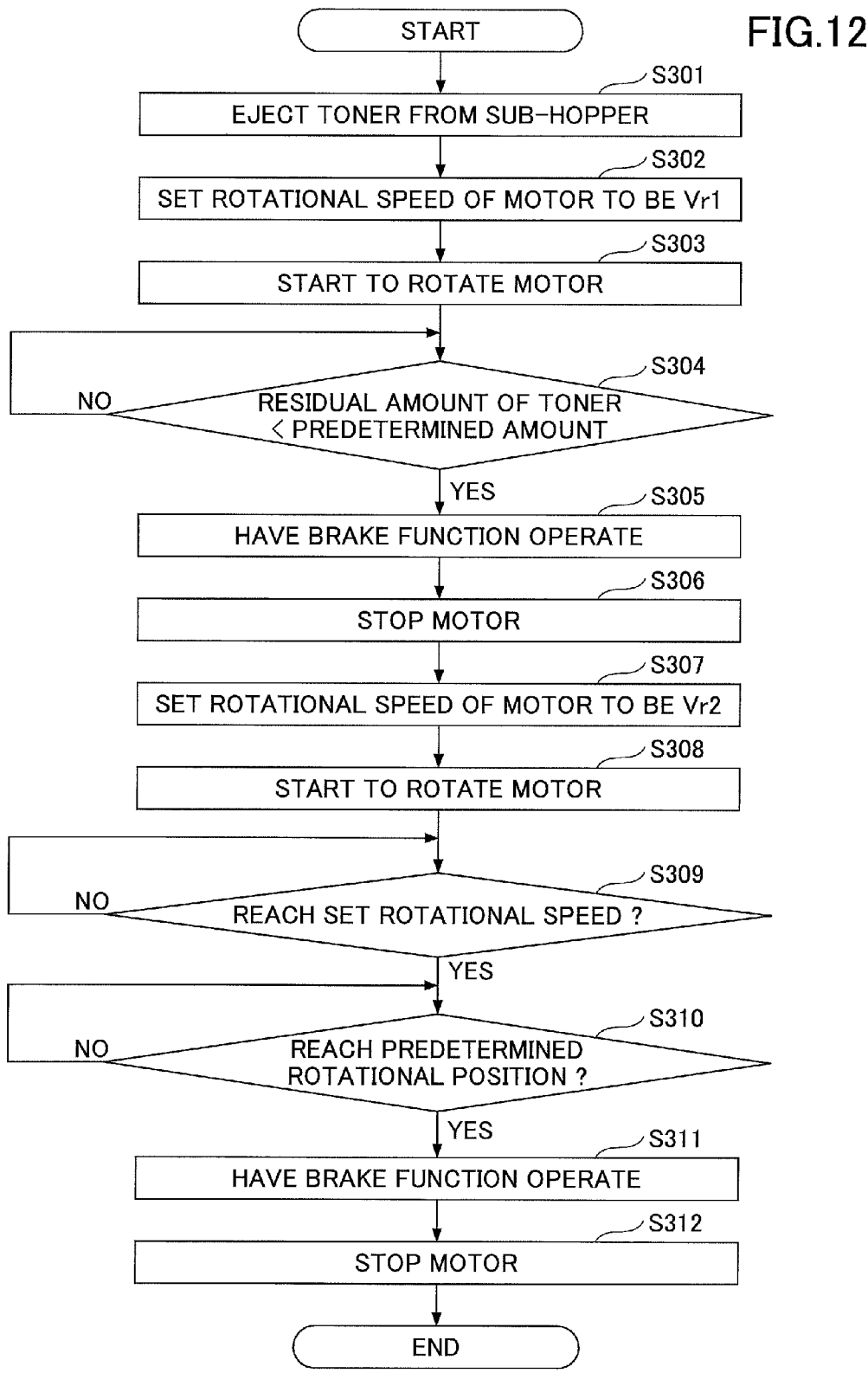
FIG. 12 is a flowchart for illustrating an example motor control process of the third embodiment.

FIG. 12 is a flowchart for illustrating an example motor control process of the third embodiment.

For example, in a case where the developing device 4S of a color is replace with that of another color in the image forming apparatus 1, the toner remained in the sub-hopper 22S is ejected to the developing device 4S in step S301.

When the toner is ejected from the sub-hopper 22S to the developing device 4S, for example, the motor speed setting unit 111 sets the rotational speed of the motor 130 to be Vr1 in step S302. In step S303, the motor control unit 112 transmits the enable signal at the low level to the motor driver 120 to have the motor 130 rotate at the rotational speed Vr1 set by the motor speed setting unit 111.

In the developing device 4S, for example, the developer conveyance screw rotates, which is connected to the driven shaft 420 rotated by the motor 130 through a transmission means, thereby ejecting the toner having been ejected from the sub-hopper 22S outside the developing device 4S through the toner outlet 411.

Here, in step S302, preferably, the motor speed setting unit 111 sets the rotational speed Vr1 of the motor 130 to be great to the extent possible so that the toner remained in the sub-hopper 22S is quickly ejected from the developing device 4S. When ejecting the toner from the sub-hopper 22S, for example, the rotational speed Vr1 is preferably set to be greater than the rotational speed V1 and V2 shown in FIG. 9 since the variance of the stop position of the drive side coupling 160 does not need to be considered.

In step S304, the toner residual amount acquiring unit 114 acquires the detection result of the residual amount detection sensor 23S of the toner supply unit 20S and determines whether the residual amount of the toner in the sub-hopper 22S is less than a predetermined amount. The toner is continued to be sent from the sub-hopper 22S to the developing device 4S to be ejected from the toner outlet 411 until the residual amount of the toner in the sub-hopper 22S is determined to be less than the predetermined amount.

Upon the residual amount of the toner in the sub-hopper 22S being determined to be less than the predetermined amount, the motor control unit 112 transmits the brake signal to the motor driver 120 in step S305, thereby having the brake function of the motor 130 operate. In step S306, the motor control unit 112 transmits the enable signal at the high level to the motor driver 120 to stop driving the motor 130.

In step S307, for example, the motor speed setting unit 111 sets the rotational speed of the motor 130 to be Vr2. In step S308, the motor control unit 112 transmits the enable signal at the low level to the motor driver 120 to have the motor 130 rotate at the rotational speed Vr2 set by the motor speed setting unit 111.

Here, in step S307, for example, the motor speed setting unit 111 sets the rotational speed Vr2 to be less than the rotational speed in the normal drive for forming an image by the image forming apparatus 1, etc., and equal to or less than the rotational speed V2 shown in FIG. 9 so that the stop position of the drive side coupling 160 comes within a target range of the rotational position.

In step S309, the motor control unit 112 determines whether the rotational speed of the motor 130 reaches the set rotational speed based on the lock signal transmitted from the motor driver 120.

In a case where the rotational speed of the motor 130 is determined to reach the set rotational speed, the process is proceeded to step S310, and the rotational position acquiring unit 113 acquires the detection result of the rotational position detection sensor 150 and determines whether the rotational position of the driving shaft 140 and the drive side coupling 160 reaches a predetermined rotational position.

Upon the rotational position detection sensor 150 detecting that the drive side coupling 160 is at the predetermined rotational position, the motor control unit 112 transmits the brake signal to the motor driver 120 to have the brake function of the motor 130 operate in step S311. In step S312, the motor control unit 112 transmits the enable signal at the high level to the motor driver 120 to have the motor 130 stopped.

Additionally, the motor 130 may not have the brake function. In this case, processes performed in step S305 and step S311 are omitted, and for example, the rotational speed of the motor 130 set in step S307 is less than the rotational speed in the normal drive for forming an image by the image forming apparatus 1, etc., and equal to or less than the rotational speed V1 shown in FIG. 6 and FIG. 9.

Additionally, although in the example shown in FIG. 12, the motor 130 is stopped in steps S305 and S306, the motor control process of the third embodiment may start while the motor 130 is driven.

According to the motor control process of the third embodiment, the different color toner mixing can be prevented since the toner remained in the sub-hopper 22S is quickly ejected from the developing device 4S when the developing device 4S of the color is replace with a developing device 4S of another color. Also, similarly to the first embodiment and the second embodiment, the drive side coupling 160 can be stopped at a rotational position within a target range of the rotational position. Therefore, the damage in replacing the developing device 4S caused by the collision of the projection portions 170 and 440 of the drive side coupling 160 and the developing side coupling 430 can be reduced.

The motor control processes described in the first embodiment and the second embodiment may be always performed when the developing device 4 driven in the normal drive of the motor 130 is sopped, or they may be performed when the operational unit 60 of the image forming apparatus 1 accepts an instruction for setting the operation mode to be the replacement mode of the developing device 4. Also, for example, the motor control processes described in the first embodiment and the second embodiment are performed when the developing device 4 is stopped and the user's instruction for setting the operation mode to be the replacement mode of the developing device 4 is accepted. For example, the motor control processes described in the third embodiment is performed when the user's instruction for setting the operation mode to be the replacement mode of the developing device 4S is accepted.

As described above, according to the driving apparatus 100 described in the embodiments, the motor 130 is controlled so that the drive side coupling 160 is stopped at a certain rotational position when the developing device 4, which is the driven apparatus, is replaced.

Therefore, by adjusting the rotational position of the developing side coupling 430 of the newly attached developing device 4 in advance, the damages to the drive side coupling 160 and the developing side coupling 430 caused by the collision of the projection portions 170 and 440 of the drive side coupling 160 and the developing side coupling 430 can be reduced. Hence, the durability of the coupling part for coupling the driving apparatus and an apparatus driven by the driving apparatus can be maintained, where the coupling part is the drive side coupling 160 of the driving apparatus 100 and the apparatus driven by the driving apparatus is the developing device 4.

For example, in the image forming apparatus 1 described in the embodiments, the damages to the drive side coupling 160 and the developing side coupling 430 can be reduced even if the developing device 4S is frequently replaced. Therefore, in the image forming apparatus 1, the developing device 4S can be repeatedly and smoothly attached/detached, and for example, the driving-force of the motor 130 of the driving apparatus 100 can be transmitted to the developing device 4S without being reduced through the drive side coupling 160 or the developing side coupling 430.

Additionally, in the embodiments described above, although the driving apparatus 100 drives the developing device 4, the detachable units such as a photoconductor drum 2, the intermediate transfer belt 8, the secondary transfer roller 9, or the fixing device 50 may be driven with a similar configuration. Also, in the embodiments described above, although the driving apparatus 100 provided for the image forming apparatus 1 is described, the driving apparatus 100 may be provided for an apparatus other than the image forming apparatus 1 as long as it includes a detachable unit.

Also, in the embodiments described above, although an electrophotographic image forming apparatus for forming an image of full-color is described as the image forming apparatus 1, the image forming apparatus 1 may not be the electrophotographic image forming apparatus and is not limited to the configuration described above as long as it includes a detachable unit.

Further, the functions of the driving apparatus 100 described in the embodiments are achieved by executing a program by a computer, where the respective processes described above are encoded in a programming language suitable for the driving apparatus 100 described in the embodiments to create the program. The program for achieving the functions of the driving apparatus 100 described in the embodiments may be stored in a computer readable recording medium.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2014-223088 filed on Oct. 31, 2014, and Japanese Priority Application No. 2015-194992 filed on Sep. 30, 2015, the entire contents of which are hereby incorporated herein by reference.

What is claimed is:

1. A driving apparatus comprising:
a driving unit configured to rotate a driving shaft;
a speed setting unit configured to set a rotational speed at which the driving unit rotates the driving shaft;
a driving shaft joint connected with the driving shaft to rotate with the driving shaft for transmitting driving-force to a driven apparatus, the driving shaft joint being fitted into a driven shaft joint connected with the driven apparatus that is made detachable;
a rotational position detection unit configured to detect a predetermined rotational position of the driving shaft joint; and
a driving control unit configured to control the driving unit; wherein
upon an instruction indicating that the driven apparatus will be detached being given to the driving control unit, the driving control unit controls the driving unit to stop the rotating driving shaft based on a detection result of the rotational position detection unit after the speed setting unit sets the rotational speed of the driving shaft to be a first rotational speed, the first rotational speed being less than a normal rotational speed of the driving shaft set in normal operation of the driven apparatus.

2. The driving apparatus as claimed in claim 1, wherein the driving unit is a DC motor.

3. The driving apparatus as claimed in claim 2, wherein the DC motor has a brake function, and
upon the instruction indicating that the driven apparatus will be detached being given, the driving control unit has the brake function of the DC motor operate based on the detection result of the rotational position detection unit.

4. An image forming apparatus including the driving apparatus as claimed in claim 1.

5. The image forming apparatus as claimed in claim 4, comprising:
- a tonner supply unit configured to supply toner to the driven apparatus; and
- a residual amount detection unit configured to detect a residual amount of the toner in the tonner supply unit; wherein the driven apparatus includes
- a developing unit configured to develop an image by using the toner and
- a toner outlet for ejecting redundant toner, and upon the instruction indicating that the driven apparatus will be detached being given, the speed setting unit sets the rotational speed of the driving shaft to be a second rotational speed until the residual amount of the toner detected by the residual amount detection unit becomes equal to or less than a predetermined amount, the second rotational speed being greater than the first rotational speed.

6. A method of driving control for a driving apparatus including
- a driving unit configured to rotate a driving shaft, a driving shaft joint connected with the driving shaft to rotate with the driving shaft for transmitting driving-force to a driven apparatus, the driving shaft joint being fitted into a driven shaft joint connected with the driven apparatus that is made detachable, the method comprising the steps of:

setting a rotational speed at which the driving unit rotates the driving shaft to be a first rotational speed, the first rotational speed being less than a normal rotational speed of the driving shaft set in normal operation of the driven apparatus;

detecting a predetermined rotational position of the driving shaft joint; and upon an instruction indicating that the driven apparatus will be detached being given, controlling the driving unit to stop the rotating driving shaft based on a detection result of the step of detecting.

7. A non-transitory computer-readable recording medium having stored therein a program for causing a computer to perform the method as claimed in claim 6.

* * * * *